United States Patent [19]

Maekawa et al.

[11] Patent Number: 4,483,181

[45] Date of Patent: Nov. 20, 1984

[54] COMBUSTION PRESSURE PEAK DETECTOR FOR COMBUSTION CONTROL FOR AN INTERNAL COMBUSTION ENGINE

[75] Inventors: Koji Maekawa; Shogo Kawajiri, both of Aichi, Japan

[73] Assignee: NGK Spark Plug Co., Ltd., Aichi, Japan

[21] Appl. No.: 440,376

[22] Filed: Nov. 9, 1982

[30] Foreign Application Priority Data

Nov. 10, 1981 [JP] Japan .................. 56-179952

[51] Int. Cl.³ .............................................. G01L 9/08
[52] U.S. Cl. .......................................... 73/35; 73/714; 310/338
[58] Field of Search ...................... 73/DIG. 4, 35, 714; 123/425, 435; 310/329, 328, 338

[56] References Cited

U.S. PATENT DOCUMENTS 2,068,744  1/1937  Gutzke ..................... 73/DIG. 4
2,879,450  3/1959  Baker ........................... 73/35
3,151,258  9/1964  Sonderegger et al. ......... 73/35 X
4,399,705  8/1983  Weiger et al. ............. 73/DIG. 4

Primary Examiner—James J. Gill
Attorney, Agent, or Firm—Sughrue, Mion, Zinn, Macpeak & Seas

[57] ABSTRACT

A combustion pressure peak detector comprised of a pair of flat annular piezo-electric elements separated by a flat metal electrode plate are located on a bolt for securing a cylinder head to a block of an internal combustion engine. The piezo-electric elements are engaged on opposite sides by two pressure plates adapted to engage the head of the bolt and the cylinder head respectively. At least one of the pressure plates may have a cup-shaped configuration for enclosing the piezo-electric unit and an inter-fitting projection and notch arrangement may be provided on the respective pressure plates to prevent relative rotation between the two pressure plates during tightening of the bolt.

1 Claim, 7 Drawing Figures

COMBUSTION PRESSURE PEAK DETECTOR FOR COMBUSTION CONTROL FOR AN INTERNAL COMBUSTION ENGINE

BACKGROUND OF THE INVENTION

The present invention is directed to a combustion pressure peak detector for combustion control of an internal combustion engine and more specifically to a pressure peak detector which can determine the crank angle at the instant when the pressure in the engine cylinder is at a maximum and adjust the ignition timing and air-to-fuel ratio according to the detection signal thereby providing a negative feedback closed loop control of the crank angle when the pressure is maximum.

A similar control device of this type is disclosed by Japanese Patent Application No. 41648/1978. According to this conventional control device, the pressure in the combustion chamber is detected, the crank angle at the instant the pressure is at a maximum is determined from the detection signal and the ignition timing is adjusted at all times so that the difference between the crank angle at maximum pressure and a target value is 0 thereby providing a closed loop control for the crank angle. In order to detect the pressure within the engine cylinder a pickup is provided comprising a ceramic piezo-electric unit which is juxtaposed with the ignition plug in such a manner that the end portion of the pickup is located in the engine combustion chamber. Such an arrangement is disadvantageous in that the construction is intricate, provision for additional space is required for installing the control device on the engine and it is difficult to obtain a large output signal from such a control device. Furthermore, it is necessary to provide special cooling means in order to obtain a stable output from the ceramic piezo-electric unit of the pickup.

SUMMARY OF THE INVENTION

The present invention provides a new and improved combustion pressure peak detector for combustion control of an internal combustion engine in which all the afore-mentioned disadvantages associated with the conventional control device have been eliminated.

The present invention provides a new and improved combustion pressure peak detector for combustion control of an internal combustion engine wherein a piezo-electric element is comprised of an annular plate shaped ceramic piezo-electric unit which is maintained under pressure between the engine head and the head of a mounting bolt.

The foregoing and other objects, features and advantages of the invention will be apparent from the following more particular description of the preferred embodiments of the invention as illustrated in the accompanying drawings.

DETAILED DESCRIPTION OF THE INVENTION

Figure 1:
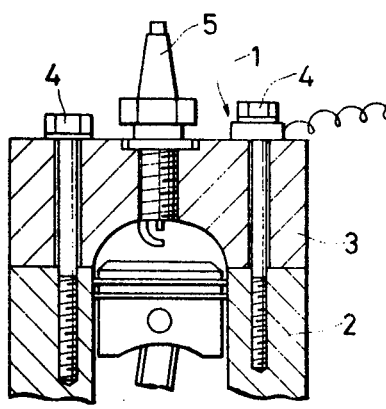
FIG. 1 is a cross-sectional schematic view showing the location of the detector according to the present invention relative to the piston and cylinder of an internal combustion engine.
Figure 2:
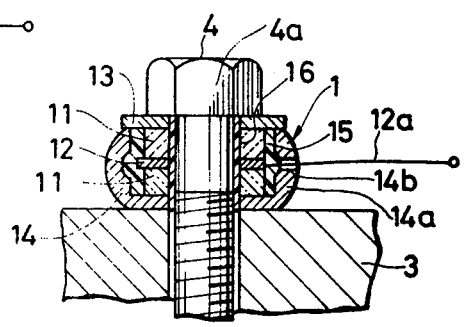
FIG. 2 is a cross-sectional side elevational view of a detector according to the first embodiment of the present invention.

FIG. 1 shows the location of the piezo-electric detector device relative to the piston and cylinder of an internal combustion engine for detecting the combustion pressure peak in the cylinder. The detector 1 which is shown in detail in FIG. 2 is comprised of a pair of annular, plate-shaped ceramic piezo-electric elements on the mounting bolt 4 for securing the cylinder head 3 to the engine block 2. The piezoelectric elements 11, 11 are each comprised of a sintered lead titanate material having the two major surfaces thereof covered with metal layers, such as silver for picking up voltage. The two piezo-electric elements 11, 11 are polarized and are assembled with a metal electrode plate 12 interposed therebetween and with the elements 11, 11 disposed opposite to each other in the direction of polarization. The stem of the mounting bolt 4 is threaded and extends through the central aperature in the piezo-electric elements and a hole in the cylinder head in a non-threaded manner and is engaged with a threaded bolt hole in the block 2. Thus, the piezo-electric elements 11, 11 are located between the head of the bolt and cylinder head 3 similar to a washer and are compressed initially by the threading of the bolt 4 into the block 2. Reference numeral 5 designates an ignition plug.

As a result of this arrangement, any variation in the pressure in the combustion chamber adjacent the piezo-electric device can be directly picked up and transmitted as a substantially large electrical output so that the peak combustion pressure can be readily detected without being confused with other noise components which occur under varying operating conditions. The detector is placed at a relatively low temperature and in a sufficiently large space so that it can be readily mounted on the engine and removed therefrom. Thus the detector can be maintained in a stable manner for a long period of time.

As best seen in FIG. 2, an annular metal pressure plate 13 is located between the piezo-electric device and the head of the bolt 4 and a cup-shaped metal pressure plate 14 having a hole in the bottom thereof is located between the piezo-electric device and the cylinder head 3. The cup-shaped pressure plate 14 in conjunction with the pressure plate 13 substantially encloses the piezo-electric elements 11, 11. That is, the depth of the cup-shaped pressure plate 14 is slightly larger than the combined thickness of the piezo-electric elements 11, 11 and the electrode plate 12 inserted therein. The side wall 14a of the cup-shaped pressure plate 14 is disposed in contact with the plate 13 which engages the head of the bolt 4 so that the force used for tightening the bolt will adjust the pressure initially applied to the piezo-electric elements 11, 11. The cupshaped pressurizing plate 14 has a hole 14b in the side-wall 14a through which the output leads 12a of the piezo-electric elements extend.

An insulating material 15, such as flexible molded resin, fills the gap between the piezo-electric elements and the wall 14a of the cup-shaped pressure plate 14, and a cylindrical insulator 16 of flexible resin material is secured between the stem of the bolt and the piezo-electric elements and electrode plate. Although, in the embodiment shown, the upper pressure plate 13 is formed in a dish to engage with the lower cup-shaped pressure plate 14, it is apparant that the lower pressure plate may be formed in a dish to engage with the upper cup-shaped pressure plate.

Figure 3:
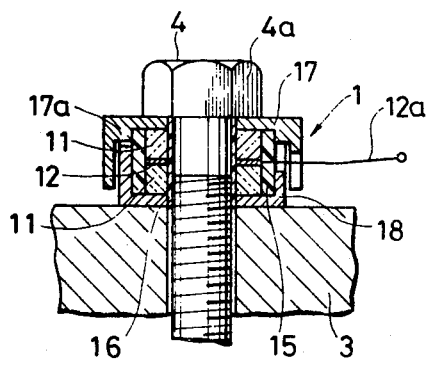
FIG. 3 is a cross-sectional side elevational view of a detector according to a second embodiment of the present invention.
Figure 4A:
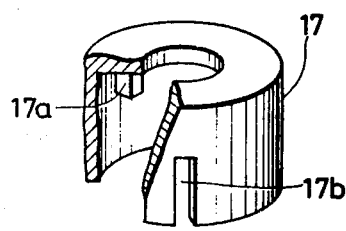
FIGS. 4A and 4B show the top and bottom elements, respectively, for retaining the piezo-electric device shown in FIG. 3.
Figure 4B:
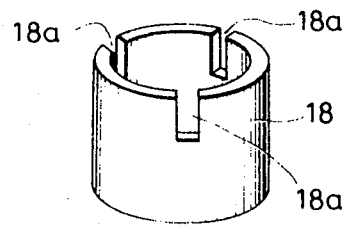

Another embodiment of the pressure detector is shown in FIGS. 3, 4A and 4B wherein the piezo-electric elements 11, 11 and the electrode plate 12 are located between two interfitting cup-shaped pressure plates 17 and 18 each of which is provided with a hole in the bottom thereof for reception of a bolt 4. The two pressure plates have rotation limiting means which are engaged with each other so that displacement in the direction of rotation of the pressure plates is limited and the application of an excessively large shearing force to the piezo-electric elements 11, 11 and the electrode plate 12 is prevented in mounting the detector on the engine. The rotation limiting means is best seen in FIGS. 4A and 4B wherein an internal protrusion 17a is provided on the cup-shaped pressure plate 17 for engagement in any one of three equally spaced recesses 18a formed in the peripheral edge of the cup-shaped element 18. The cup-shaped pressure plate 17 is also provided with a recess in the peripheral edge which is spaced from the protrusion 17a at a distance equal to the spacing between two adjacent recesses 18a so that the recess 17b and one of the recesses 18a can provide an opening through which the leads 12a may extend as best seen in FIG. 3. Although, in the embodiment shown, the pressure plates 17 and 18 are formed in a cup, it is apparent that one pressure plate may be formed in a dish.

A compressive stress of about 4 tons/cm$^2$ to 5 tons/cm$^2$ may be applied to the ceramic piezo-electric unit for a long period of time. When the configuration and size of the ceramic piezo-electric unit of the detector according to the present invention which is interposed between the head of a bolt and the cylinder head are essentially similar to those of a flat washer which is ordinarily employed and the force of tightening the bolt in the axial direction is uniformly distributed to the upper and lower surfaces of the ceramic piezo-electric unit, even when an additional force attributed to the combustion pressure is applied, it is relatively easy to set the force in the above-described compressive stress range. However, it has been found that the torsional force which is applied to the ceramic piezo-electric unit during tightening of the bolt is liable to exceed the allowable shearing force and may damage the ceramic piezo-electric unit, thus lowering the stability thereof. For this reason, the above-described rotation limiting means are provided between the two cup-shaped pressure plates 17 and 18.

When combustion occurs in the engine, pressure is applied to the cylinder head 3 and is transmitted in a dispersion mode to the heads 4a of a plurality of bolts 4 which secure the cylinder head to the engine block. In this case, a high pressure is applied to the detector 1 since a large explosive force is generally imparted to the closest mounting bolt. The peak pressure detected by the detector is indicated by an increase in the output signal from the piezo-electric unit. When the detector is located in the position shown in the embodiments of FIGS. 2 and 3 the level of heating of the detector is such that it is unnecessary to provide cooling means for the detector while the detector provides a stable output at all times.

According to various experiments it has been found that when one detector is mounted on a mounting block between every two cylinders, the detectors thus mounted can be used in a parallel mode. When a circuit as shown in FIG. 5 utilizes the detectors arranged in this manner it is possible to determine the crank angle when the pressure in a specific combustion chamber is maximum so that the timing can be subjected to a negative feedback closed loop control.

Figure 5:
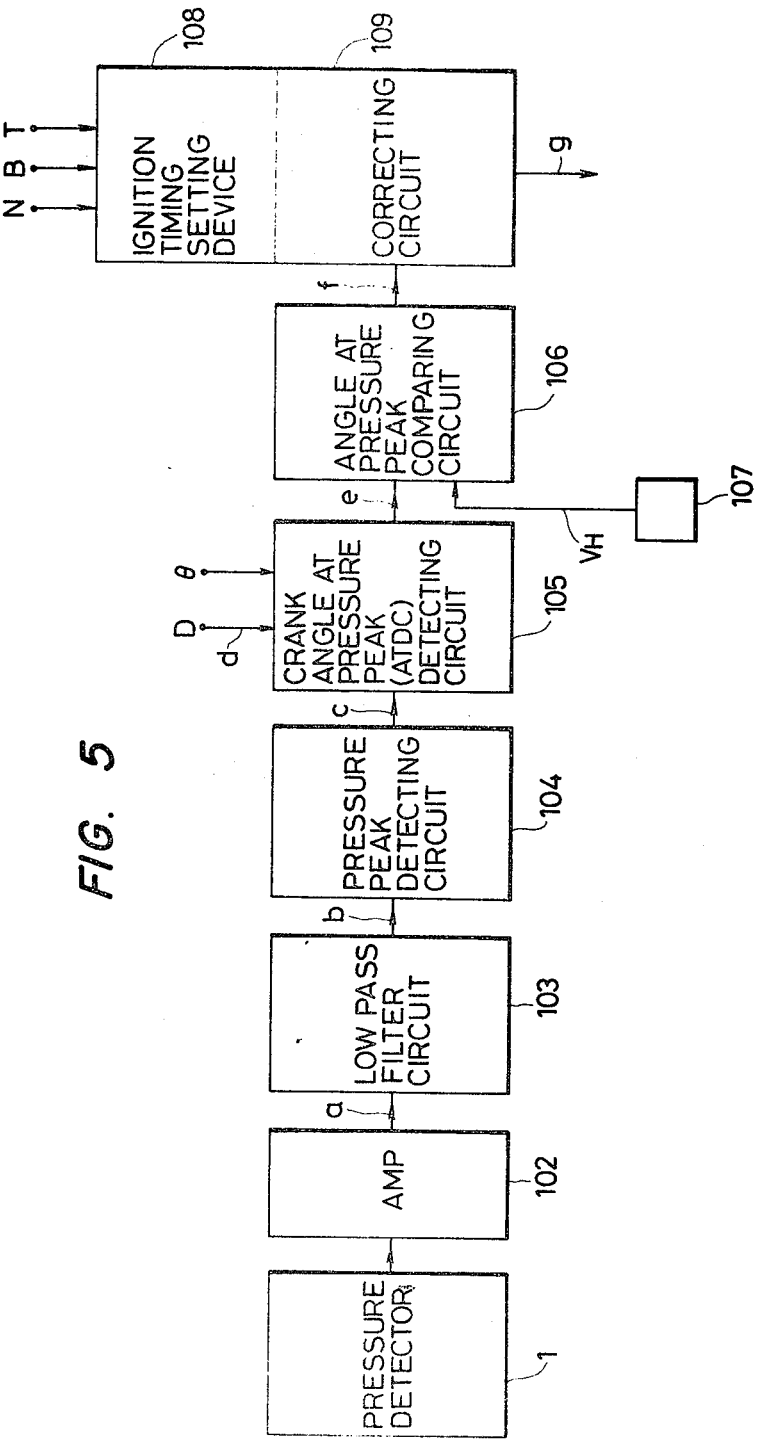
FIG. 5 is a schematic circuit for the closed loop control of the crank angle relative to peak combustion pressure.
Figure 6:
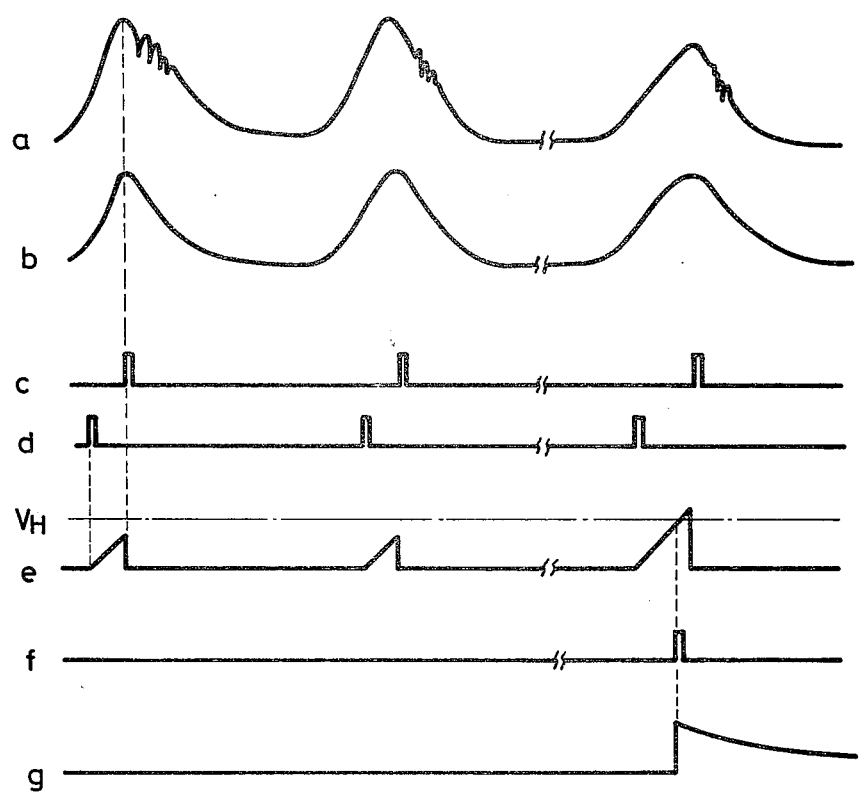
FIG. 6 is a graphic display of various control signals associated with the closed loop control.

In FIG. 5 the reference numeral 1 designates the peak pressure detector which provides an output signal a to an amplifier 102 having a sufficiently high input impedence to provide an output wave form as shown in FIG. 6 from which the variation of the pressure in the cylinder, especially the time instant when the pressure becomes maximum, can be detected in a practical manner without delay. The signal a is then directed to a low pass filter 103 wherein the output wave form of the signal a is smoothed into the wave form shown as signal b in FIG. 6. The signal b then passes through a differentiation circuit 104 for detecting the time instant at which the signal reaches its peak.

The circuit 105 detects the crank angle when the pressure in a cylinder is at the maximum. The circuit 105 receives the output signal c as shown in FIG. 6 from the detecting circuit 104, the output signal d as shown in FIG. 6 from a crank angle position sensor (or a top dead center sensor) which is disposed in close proximity to a protrusion on the periphery of a disc connected directly to the crank shaft or to each of two protrusions which are provided diametrically opposed on the periphery of the disc and the output (the pulse being constant angular width) of an angle sensor $\theta$ which is disposed close to the protrusions which are provided on the periphery of the disc at intervals of 1°. The circuit 105 is essentially a flip-flop circuit which is started by the input signal d and is reset by an input signal c, a gate circuit to which the output of the angle sensor is applied with the output of the flip-flop as the gate signal, and an integration circuit for integrating the output of the gate circuit. The peak value of the output signal e of the integration circuit integrates a crank angle (ATDC) when the pressure is at a maximum. The signal e is directed to an angle comparing circuit 106 in which the angle signal e is compared with a limit value $V_A$ provided by a setting unit 107 and when the angle exceeds the limit value, an ignition timing correction signal f (which is a leading angle correcting signal in this case) in the form of a pulsed signal is provided. An ignition timing setting (or calculating) device 108 is responsive to signals from an engine speed sensor, a load sensor (or a boost pressure sensor) and a cooling water temperature sensor for calculating the correct ignition timing at that time in a digital or analog mode and instantaneously sets the ignition timing thus calculated so that an ignition signal is applied to the ignition coil in accordance with the ignition thus set. The ignition timing setting device 108 is provided with a set ignition timing correcting circuit 109 so that the set ignition timing is advanced or delayed in accordance with the signal f provided thereto. The signal g is used to achieve the correction according the frequency of occurrence of the correcting signal which has been subjected to ignition timing correction. By means of this signal the ignition timing for combustion is determined.

The device for carrying out the negative feedback closed loop control of the crank angle at the instant the pressure in the combustion chamber is at a maximum is not always limited to the above-described device in which correction control is effective. That is, the detector of the present invention can be applied to a control device such as that disclosed by laid open Japanese Patent Application No. 41648/1978 in which a target value is set for a crank angle provided when the pressure is at a maximum and the crank angle is detected at all times so that the ignition timing is adjusted according to a digital system wherein the difference between the crank angle thus detected and the target value is 0.

The detector according to the present invention which is adapted to detect the time instant when the pressure in the combustion chamber is maximum for combustion control of the internal combustion engine, is effective in correcting, at suitable times, the fluctuation in combustion timing of an engine in which the combustion of an air-gas mixture is carried out thereby improving the efficiency of combustion. In the control according to the crank angle which is determined when the pressure in the combustion chamber is at a maximum, as was described above, the output of the device according to the present invention is substantially larger than that obtained by the prior art devices and accordingly the crank angle can be detected more accurately and in a more stable manner with the detector of the present invention.

While the invention has been particularly shown and described with reference to preferred embodiments thereof, it will be understood by those in the art that the foregoing and other changes in form and details may be made therein without departing from the spirit and scope of the invention.

What is claimed is:

1. In a combustion pressure peak detector for the combustion control of an internal combustion engine of the type having a block and cylinder head defining at least one combustion chamber and having at least one headed bolt adjacent said combustion chamber for securing said cylinder head to said engine block, said combustion pressure peak detector comprising a first metallic cup-shaped pressure member having a central hole therein, an annular plate-shaped ceramic piezo-electric unit disposed in said first pressure member, a second metallic cup-shaped pressure member having a central hole telescopically engaging said first cup-shaped pressure member and disposed in engagement with said piezo-electric unit, said first and second pressure members and said piezo-electric unit surrounding said bolt with one of said pressure members disposed in engagement with said cylinder head and the other of said pressure members being disposed in engagement with the head of said bolt, interfitting means on said first and second pressure members for permitting movement of said pressure members toward and away from each other while preventing relative rotation between said pressure members, and circuit means for detecting a signal provided by said piezo-electric unit to determine the combustion peak pressure in said combustion chamber.

* * * * *